United States Patent [19]

Moores et al.

[11] Patent Number: 4,990,741
[45] Date of Patent: Feb. 5, 1991

[54] METHOD OF LASER WELDING

[75] Inventors: Ralph J. Moores, Thousand Oaks; Daniel S. Gnanamuthu, Westlake Village, both of Calif.

[73] Assignee: Rockwell International Corporation, El Segundo, Calif.

[21] Appl. No.: 477,409

[22] Filed: Feb. 6, 1990

[51] Int. Cl.$^5$ .............................................. B23K 26/00
[52] U.S. Cl. ............................ 219/121.64; 219/121.84; 219/121.75
[58] Field of Search ...................... 219/121.63, 121.64, 219/121.84, 121.73, 121.74, 121.75, 121.13, 121.14, 121.25, 121.26, 121.33

[56] References Cited

U.S. PATENT DOCUMENTS

| 4,128,753 | 12/1978 | Sharp | 219/121.63 |
| 4,577,087 | 3/1986 | Chadwick | 219/121.63 |
| 4,723,063 | 2/1988 | Armier et al. | 219/121.63 |
| 4,803,335 | 2/1989 | Steen et al. | 219/121.84 |

FOREIGN PATENT DOCUMENTS

| 8808353 | 11/1988 | European Pat. Off. | 219/121.63 |
| 0099494 | 6/1985 | Japan | 219/121.64 |
| 0118994 | 5/1987 | Japan | 219/121.63 |
| 0268584 | 11/1988 | Japan | 219/121.64 |

OTHER PUBLICATIONS

Laser Beam Welding, in Metals Handbook, Ninth Edition, vol. 6, Welding, Brazing & Soldering, pp. 647–672, (American Society for Metals, 1983).

Primary Examiner—C. L. Albritton
Attorney, Agent, or Firm—John J. Deinken

[57] ABSTRACT

First and second metallic components are joined along a weld path by providing a beam of coherent electromagnetic energy having sufficient power to melt the first and second components and providing a low turbulent flow of an inert shielding gas over a weld region along a portion of the weld path. The beam is focussed on the weld region such that the beam energy is linearly distributed in the direction of the weld path with an intensity sufficient to form a pool of molten metal in the weld region. Relative motion is then established between the components and the beam to cause the weld region to move along the weld path, thereby joining the first and second components along the weld path.

12 Claims, 3 Drawing Sheets

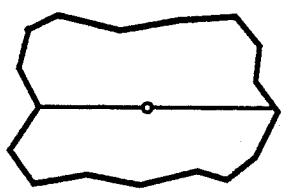
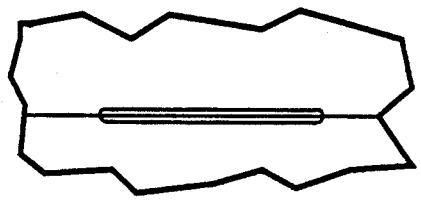
FIGURE 2A  FIGURE 2B
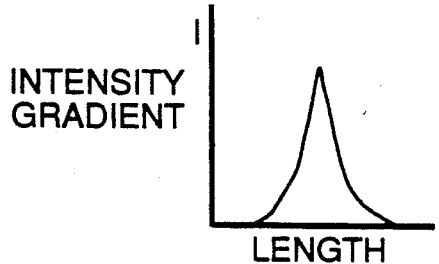
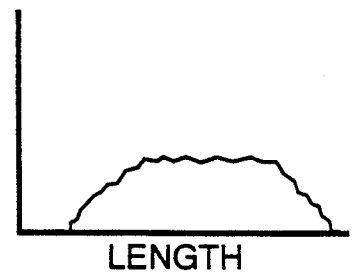
FIGURE 2C  FIGURE 2D
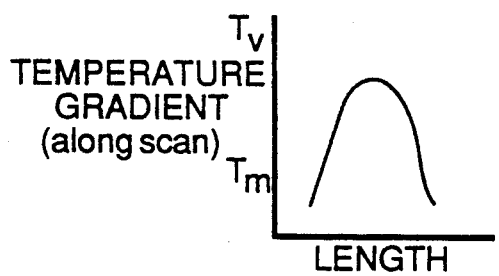
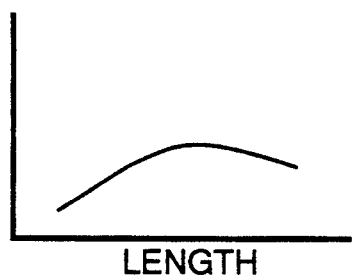
FIGURE 2E  FIGURE 2F
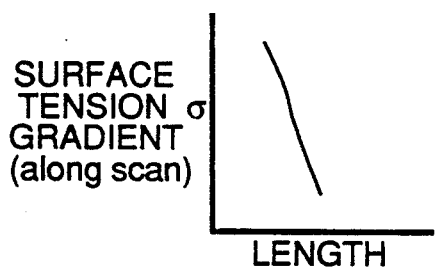
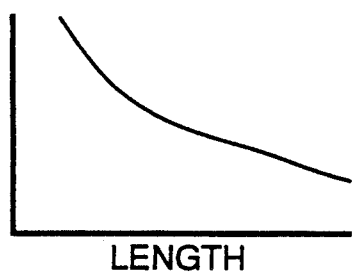
FIGURE 2G  FIGURE 2H

METHOD OF LASER WELDING

BACKGROUND OF THE INVENTION

This invention relates to the field of welding and particularly to laser welding. Many different heating sources have been used for welding. Among the most common are combustible gases, electrical resistance (for spot welding), electric arc, and friction. With the development of lasers in recent years, coherent light has become a viable welding source as well. A laser provides a unique source of radiant energy whose intensity and position can be precisely controlled. In laser beam welding, the beam is focused near the surfaces of the materials to be joined and the beam is moved to melt the advancing metal and form the weld. An inert gas atmosphere may be provided to protect the hot metal from oxidation. In some applications, a mild stream of inert gas is used to provide oxidation protection as well as to promote "keyholing", i.e., a deep penetration mode in which the laser melts a small cylindrical volume through the thickness of the material. For a general overview of laser welding, see Laser Beam Welding in Metals Handbook, Ninth Edition, Volume 6, Welding, Brazing and Soldering, Pages 647 to 671 (American Society for Metals, 1983).

Although lasers have been used successfully to weld many different metals, there exists a continuing need to apply laser welding techniques to additional alloys and joint configurations. Additionally, there is a need in the laser welding field to improve the quality and producibility of laser welds by eliminating cracking, insufficient penetration, blow holes, porosity, and other quality problems.

SUMMARY OF THE INVENTION

By focusing a laser beam to create a linear distribution of beam energy along the length of a weld region and by providing an atmosphere with a low turbulent flow of shielding gas around the weld region, this invention provides, for the first time, a technique by which high quality laser welds can be achieved in such difficult materials as titanium aluminide alloys.

First and second metallic components are joined along a weld path by providing a beam of coherent electromagnetic energy having sufficient power to melt the first and second components and providing a low turbulent flow of an inert shielding gas over a weld region along a portion of the weld path. The beam is focused on the weld region such that the beam energy is linearly distributed in the direction of the weld path with an intensity sufficient to form a pool of molten metal in the weld region. Relative motion is then established between the components and the beam to cause the weld region to move along the weld path, thereby joining the first and second components along the weld path.

In a more particular embodiment, the step of focusing the beam involves concentrating the beam in a direction perpendicular to the direction of the weld path. The step of focusing may further involve focusing the beam on the weld region by directing the beam through a cylindrical lens.

The beam may be provided by a laser, such as a continuous wave carbon dioxide laser. Moreover, the energy of the beam may be distributed in a weld region approximately 0.03 inch wide and 0.5 inch long and the relative motion between the components and the beam may be at least approximately 5 inches per minute. The method is particularly useful where the first and second components are titanium aluminide alloys.

The step of providing a low turbulent flow of shielding gas may be accomplished with shielding hood having at least one gas outlet over the weld region. One example of a shielding hood includes a plate which is porous with respect to the shielding gas for positioning over the weld region and a cover joined to the porous plate such that the cover and the porous plate define a chamber for receiving the shielding gas. A manifold disposed within the chamber provides a flow of the shielding gas into the chamber. A first opening in the cover and a second opening in the porous plate are positioned such that the beam can pass through the hood and impinge on the weld region.

DESCRIPTION OF THE DRAWINGS

FIGS. 2A-2H are a comparison of a laser spot source with a laser line source with respect to the characteristics of beam focus pattern, intensity gradient, temperature gradient, and surface tension gradient; and FIG. 3 is a graph of laser intensity versus welding speed, depicting the region in which good welds were obtained in a titanium aluminide alloy sample with a nominal thickness of 0.04 in.

DESCRIPTION OF THE INVENTION

Welding titanium aluminide alloys using conventional techniques, such as a gas tungsten arc, results in welds having serious cracking problems. It is an outstanding feature of this invention to combine the use of a carefully controlled beam profile with a low turbulent flow of an inert shielding gas to produce high quality welds in such high performance alloys.

The welding method of this invention generally provides for joining metallic components are joined along a weld path by providing a beam of coherent electromagnetic energy having sufficient power to melt the first and second components. A low turbulent flow of an inert shielding gas is provided over a weld region along a portion of the weld path. The beam is focused on the weld region such that the beam energy is linearly distributed in the direction of the weld path with an intensity sufficient to form a pool of molten metal in the weld region. Relative motion is then established between the components and the beam to cause the weld region to move along the weld path, thereby joining the first and second components along the weld path.

Figure 1:
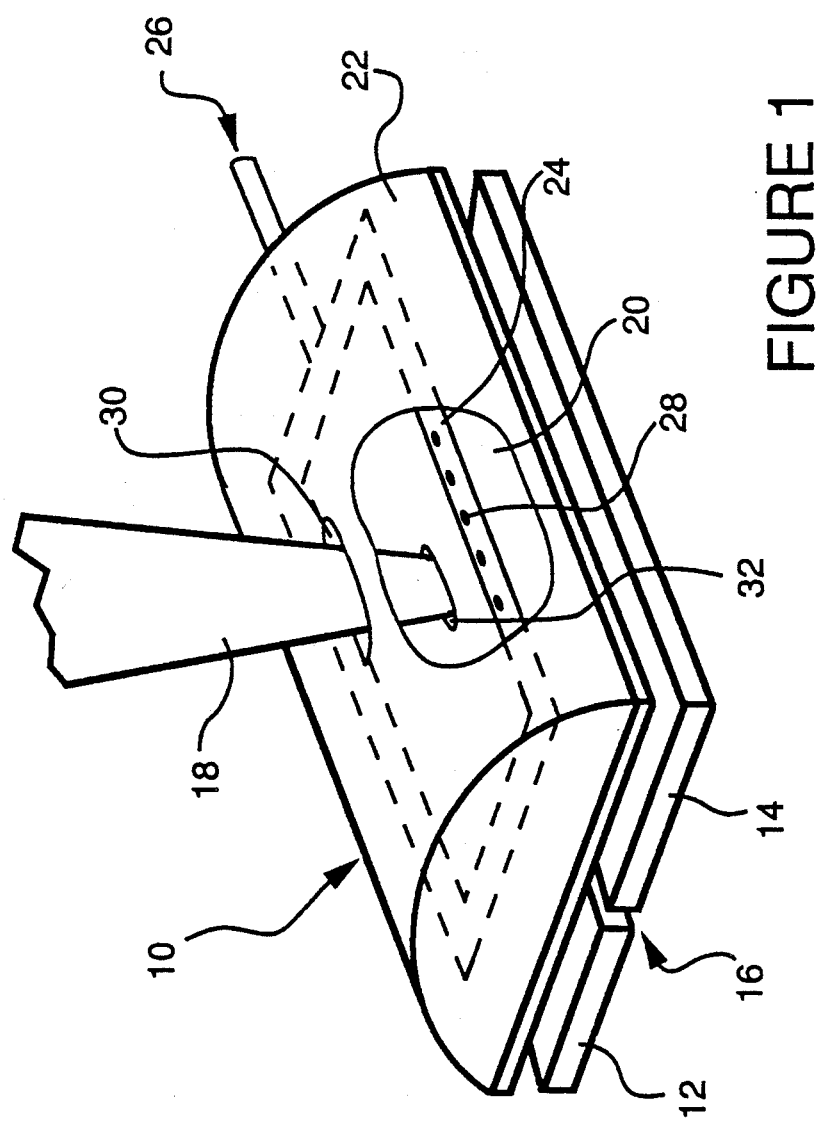
FIG. 1 is a perspective, partially cutaway view illustrating a shielding hood constructed according to the invention.

A particular embodiment of this invention can be described in conjunction with FIG. 1, which is a perspective, partially cutaway view illustrating a shielding hood 10 constructed according to the invention. First and second metallic components 12 and 14 are joined along a weld path generally corresponding to the junction 16 between the components. A beam of coherent electromagnetic energy 18, is provided, for example, by a carbon dioxide gas laser. In the embodiment of the invention illustrated in FIG. 1, the low turbulent shielding gas environment is provided by the shielding hood 10, which includes a diffuser 20 which is porous to allow the shielding gas to effectively flow through the diffuser. A cover 22 is joined to the diffuser such that the cover and the diffuser define a chamber for receiving the shielding gas. A manifold 24 has an inlet 26 for connection to a source of inert gas and is arranged within the chamber to provide a flow of the shielding gas into the chamber through a series of openings, such as the opening 28, in the manifold. In the embodiment illustrated, the openings 28 are directed toward the cover 22 to promote a more even flow through the diffuser. An opening 30 in the cover and an opening 32 in the diffuser are positioned so that the beam 18 can pass through the hood and impinge on the weld region. The diffuser is positioned adjacent the weld region to protect the molten weld pool and to provide a uniform and non-turbulent flow of the shielding gas. In this manner, the amount of air aspirated into the chamber is minimized, thereby protecting the weld from contamination by the atmosphere.

To verify the utility of this invention in avoiding the problems experienced in the prior art with welding of titanium aluminide alloys, a series of welds (Examples 1-3) were made using a Spectra-Physics Model 975 laser system which produces a 5 kW continuous-wave CO2 laser beam at 10,600 nm. Square butt welds were made (without using filler metal) in a titanium aluminide alloy know as super alpha 2, with a composition by weight of 14% Al, 20% Nb, 2% V, 1% Mo, 0.06% Fe, and the balance Ti. The test coupons measured 25 mm wide and 75 mm long with machined edges. The surfaces of the material were cleaned thoroughly to remove organic contaminants. All the welds were made using the shielding hood of this invention, rather than the off-axis gas nozzle that has been conventionally used in prior art welding methods. The shielding hood provided a low turbulent, uniform flow of either helium or a desired mixture of helium-argon gas around the weld pool.

EXAMPLE 1—SPOT FOCUS, COUPONS 0.08–0.1 INCH THICK

Titanium aluminide alloy test coupons having a thickness of 0.08 inch to 0.1 inch were welded using 3000 W to 5000 W of laser beam power and with a welding speed ranging from 100 inches per minutes to 200 inches per minute. The laser beam was focused on the joint using a spherical lens with a 5 inch focal length, which provided a nominal spot diameter of 0.038 cm. These welding conditions should promote steep thermal gradients within the weld pool and along the parent metal. Such steep thermal gradients promote surface tension gradients which cause rapid flow of liquid metal. Under these conditions, welding is dominated by a "key-hole" mechanism forming welds with a high ratio of weld depth to weld width (see, for example, pages 655–658 of Laser Beam Welding in Metals Handbook, Ninth Edition, Volume 6, Welding, Brazing and Soldering (American Society for Metals, 1983). Crack-free welds were made using this process. The welds exhibited clean and shiny surfaces showing weld metal flow patterns.

EXAMPLE 2—SPOT FOCUS, COUPONS 0.02–0.04 INCH THICK

An attempt was made to extend the process described in Example 1 to thinner coupons (0.02 inch to 0.04 inch thick). With an objective of modelling a viable manufacturing technique, however, welding speeds were selected in the range of 30 inches per minute to 50 inches per minute. At these speeds, a laser beam power of about 1000 W was required.

Excellent square butt welds were obtained. They had a narrow weld profile, that is, a high weld depth to weld width ratio. Acceptable welds, however, could not be consistently obtained. Although some coupons had acceptable full-penetration butt welds along their entire 150 mm length, other coupons welded using the same parameters contained a number of holes, apparently caused by weld metal dropping through or boiling off. This problem could not be solved by changing the weld fixtures to prevent excessive heat build-up in the coupon or by manipulation of the helium-argon gas composition to cool the weld pool.

EXAMPLE 3—LINE FOCUS

Additional coupons were welded as described in Example 2, except that a 10 inch focal length cylindrical lens was used to focus the laser beam, rather than the 5-inch spherical lens. This focusing approach effected a linear (line source) intensity distribution of the laser beam, measuring 1.27 cm by 0.076 cm, rather than the previous circular intensity distribution (spot source) of 0.038 cm diameter. The beam was oriented so that its length was aligned with the direction of the weld joint. As shown in Table I below, this linear focusing technique provides a decreased laser beam intensity and an increased beam dwell time. As shown in FIGS. 2A–2H provides decreased gradients in intensity, in temperature, and in surface tension.

TABLE 1

| COMPARISON OF LASER SPOT SOURCE WITH LASER LINE SOURCE | | |
|---|---|---|
| Parameter | Spot Source | Line Source |
| Beam Size (cm) | 0.038 (dia) | 1.27 × 0.076 |
| Beam Area (cm$^2$) | 0.0011 | 0.096 |
| I @ 1000 W (W/cm$^2$) | 0.9 × 10$^6$ | 0.01 × 10$^6$ |
| I @ 5000 W(W /cm$^2$) | 4.5 × 10$^6$ | 0.05 × 10$^6$ |
| Beam Dwell Time (Sec) (at 30 in/min) | 0.03 | 1.0 |
| Beam Dwell Time (Sec) (at 50 in/min) | 0.018 | 0.6 |
| Energy Input (KJ/cm$^2$) (5000 W @ 50 in/min) | 82 | 31 |
| Energy Input (KJ/cm$^2$) (1000 W @ 30 in/min) | 27 | 10 |

Figure 3:
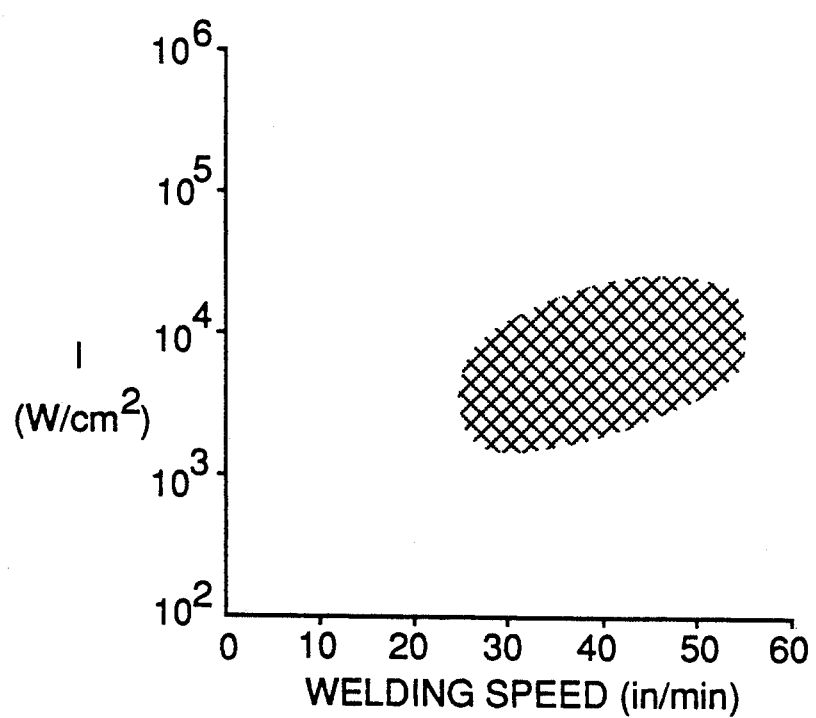

Good square butt welds without holes were obtained using the linear focusing technique. The parameters of laser beam intensity, I, and welding speed which provided good welds in accordance with Example 3 are shown by the cross-hatched area in FIG. 3. The welds had clean, shiny, smooth surfaces. The weld metal flow patterns were not easily observable. These observations suggest a stable weld pool having minimal turbulence. Under these conditions, welding is dominated by a heat conduction mechanism forming welds with a low ratio of weld depth to weld width.

The preferred embodiments of this invention have been illustrated by the examples described above. Modifications and additional embodiments, however, will undoubtedly be apparent to those skilled in the art. The openings in the shielding hood, for example, could be made from a transparent material rather than being simple openings as illustrated in FIG. 1. In addition, although the method has proven useful for welding titanium aluminide alloys, as illustrated in the above examples, it can be readily adapted for welding other alloys. Furthermore, equivalent elements may be substituted for those illustrated and described herein, and certain features of the ivention may be utilized independently of other features. Consequently, the exemplary embodiments should be considered illustrative, rather than inclusive, while the appended claims are more indicative of the full scope of the invention.

The teaching of Laser Beam Welding in Metals Handbook, Ninth Edition, Volume 6, Welding, Brazing and Soldering, Pages 647 to 671 (American Society for Metals, 1983), which is referred to herein, is incorporated by reference.

We claim:

1. A method of joining first and second metallic components along a weld path, comprising the steps of:
    providing a beam of coherent electromagnetic energy having sufficient power to melt the first and second components;
    providing a low turbulent flow of an inert shielding gas over a weld region along a portion of the weld path;
    focusing the beam on the weld region such that the beam energy is linearly distributed in the direction of the weld path with an intensity sufficient to form a pool of molten metal in the weld region; and
    establishing relative motion between the components and the beam to cause the weld region to move along the weld path, thereby joining the first and second components along the weld path.

2. The method of claim 1, wherein the step of focusing the beam further comprises:
    focusing the beam on the weld region by concentrating the beam in a direction perpendicular to the direction of the weld path such that the beam energy is linearly distributed in the direction of the weld path with an intensity sufficient to form a pool of molten metal in the weld region.

3. The method of claim 2, wherein the step of focusing further comprises:
    focusing the beam on the weld region by directing the beam through a cylindrical lens, thereby concentrating the beam in a direction perpendicular to the direction of the weld path such that the beam energy is linearly distributed in the direction of the weld path with an intensity sufficient to form a pool of molten metal in the weld region.

4. The method of claim 1 wherein the components have thicknesses in the range of approximately 0.02 inch to 0.1 inch.

5. The method of claim 1 wherein the beam has a power of at least approximately 1000 watts.

6. The method of claim 1 wherein the beam is provided by a continuous wave carbon dioxide laser.

7. The method of claim 1 wherein the energy of the beam is distributed in a weld region approximately 0.03 inch wide and 0.5 inch long.

8. The method of claim 1 wherein the first and second components further comprise titanium aluminide alloys.

9. The method of claim 1 wherein the relative motion between the components and the beam is at least approximately 5 inches per minute.

10. The method of claim 1 wherein the step of providing a low turbulent flow of shielding gas further comprises providing a shielding hood having at least one gas outlet over the weld region.

11. The method of claim 10 wherein the shielding hood further comprises:
    a plate which is porous with respect to the shielding gas for positioning over the weld region;
    a cover joined to the porous plate such that the cover and the porous plate define a chamber for receiving the shielding gas;
    a manifold disposed within the chamber for providing a flow of the shielding gas into the chamber;
    a first opening in the cover; and
    a second opening in the porous plate, the first and second openings being positioned such that the beam can pass through the hood and impinge on the weld region.

12. A method of joining first and second titanium aluminide alloy components along a weld path, comprising the steps of:
    providing a laser beam having sufficient power to melt the first and second components;
    providing a low turbulent flow of an inert shielding gas over a weld region approximately 0.03 inch wide and approximately 0.5 inch long along a portion of the weld path;
    focusing the beam on the weld region such that approximately 1000 to 5000 watts of beam energy is linearly distributed in the direction of the weld path over the weld region; and
    establishing relative motion of at least approximately 5 inches per minute between the components and the beam to cause the weld region to move along the weld path, thereby joining the first and second components along the weld path.

* * * * *